3,177,141
DRILLING FLUID
John S. Brukner and Clarence O. Walker, Houston, and Walter J. Weiss, Sugar Land, Tex., assignors to Texaco Inc., New York, N.Y., a corporation of Delaware
No Drawing. Filed June 21, 1962, Ser. No. 204,039
20 Claims. (Cl. 252—8.5)

This invention relates to the drilling of wells through subsurface formations while employing drilling fluids. More particularly, this invention relates to a drilling operation, such as a rotary drilling operation, which involves the circulation of a dispersed gyp drilling fluid through the well bore and about the drilling bit, an improved dispersed gyp drilling fluid suitable for use in a drilling operation and an additive material for the preparation of said dispersed gyp drilling fluid.

It has now been found that a specific group of compounds, namely, the water soluble inorganic stannates, arsenites, periodates, chlorates and vanadates, as well as mixtures thereof, are particularly effective in improving the high temperature properties of gyp-type drilling fluids. More particularly, this invention resides in the discovery that the water soluble alkali metal, ammonium and alkaline earth metal salts of the stannate, arsenite, periodate, chlorate, vanadate anions and mixtures thereof are especially effective in providing superior high temperature gelation properties to dispersed gyp-type drilling fluids.

A dispersed gyp drilling mud is a low alkalinity, relatively low pH calcium-containing drilling fluid, having a clay dispersing agent therein. Such a gyp mud is usually characterized by an aqueous phase having a pH in the range of about 8 to 10.7 when measured before the mud is subjected to the high temperatures encountered in the borehole, a calcium ion concentration in the aqueous phase thereof resulting from the addition of gypsum or calcium sulfate of at least 200 parts per million by weight such as a calcium ion concentration in the range 300 to 2000 p.p.m. Dispersed gyp muds also usually contain dissolved therein a minor amount of an alkaline material, such as an alkali metal and/or alkaline earth metal hydroxide, e.g., caustic soda, usually in an amount in the range 0.1 to 1.0 lb. per barrel sufficient to impart the desired alkalinity and/or pH to the resulting drilling mud, i.e., a pH within the above range and substantially below that of a saturated aqueous solution of calcium hydroxide.

There is also advantageously incorporated in these drilling muds a suitable amount of a water loss agent, such as hydrolyzed starch or carboxymethylcellulose (CMC) in a minor amount usually in the range of about 0.2 to 5 lbs., per barrel of drilling fluid to improve the water loss properties thereof. In a dispersed gyp mud the calcium ion concentration in the aqueous phase is usually obtained by incorporating or dissolving in the drilling mud a sufficient amount of a water soluble calcium salt, such as a calcium sulfate, to yield the desired calcium ion concentration. Usually calcium sulfate or gypsum in an amount in the range 1 to 10 lbs. per barrel of drilling fluid is sufficient to impart the desired calcium ion concentration in the aqueous phase thereof.

Also, there can be desirably incorporated or emulsified therein a minor amount of oil so as to improve the lubricating properties and lubricity of the drilling fluid. When oil is incorporated in a gyp mud there is also present in the drilling fluid a suitable oil emulsifying agent therefor.

In addition to the above materials, there is also incorporated in a gyp drilling mud a suitable clay dispersing agent to maintain the drilling clay particles and clayey material in suspension therein and to control the viscosity of the resulting drilling mud. Any clay dispersing agent suitable for dispersing clayey particles or drilling clay material in the drilling mud may be employed. Suitable dispersing agents include the various lignosulfonates. Particularly suitable as a dispersing agent in gyp drilling muds is a heavy-metal-containing lignosulfonate, such as a ferrochrome-containing lignosulfonate. A particularly useful ferrochrome-containing lignosulfonate is a material manufactured in accordance with U.S. 2,935,473 and U.S. 2,935,504, and sold under the trade name Q-Broxin. This material, a ferrochrome-containing lignosulfonate, containing iron in an amount of about 3.5% (calculated as $Fe_2O_3$) and chromium in an amount of about 0.20% by weight, has been found to be particularly satisfactory as a dispersing agent for clayey material in gyp muds.

The properties of various conventional dispersed gyp muds are set forth hereinbelow in Table I.

TABLE I

| Property | Gyp Mud | | | |
|---|---|---|---|---|
| | A | B | C | D |
| Wt., lbs. per gal | 10.7 | 15 | 15.4 | 15.4 |
| Viscosity funnel, sec. API | 34 | 60 | 58 | 47 |
| Viscosity Stormer, cpe | 6 | 55 | 81 | 46 |
| Initial gel, gm | 0 | 0 | 0 | 0 |
| 10 min. gel, gm | 4 | 5 | 0 | 8 |
| Filtrate, cc. API | 8.9 | 5 | 4.2 | 4.9 |
| pH | 8 | 9.5 | 8.5 | 8.5 |
| Calcium, p.p.m | 700 | 1,040 | 1,000 | 1,080 |
| Chloride, p.p.m | 1,000 | 1,000 | 1,200 | 1,100 |

A gyp-type mud has a relatively high calcium solubility but its pH is relatively low, from about 8 to 10.7, for the most satisfactory results. In general, calcium sulfate or gypsum is used to saturate the aqueous phase of a gyp mud with calcium ions in an amount above about 200 p.p.m., desirably from about 600 to 1400 p.p.m.

In a gyp-type mud the hydroxide alkalinity of the mud filtrate "$P_f$" is generally about 0.2, and is normally due to the caustic soda added to the mud to neutralize the acidity of the thinner and to buffer the system to a pH for suitable dispersion, for example, with a thinner such as Q-Broxin, a ferrochrome-containing lignosulfonate. The hydroxide alkalinity of the whole mud, "$P_m$," is normally less than 1.

The "$P_f$" of a mud refers to the number of cc. of N/50 sulfuric acid required to obtain a phenolphthalein end point in a one cc. sample of mud filtrate. The "$P_m$" of a mud refers to a sample of whole mud (solids plus filtrate) and is reported as the number of cc. of N/50 sulfuric acid needed to obtain a phenolphthalein end point in one cc. of mud. In a gyp mud the sulfuric acid reacts with anything in the mud which is readily neutralizable and any excess hydroxyl ion from the caustic soda above that needed for neutralization of the thinner.

It has been found, however, that when gyp muds are employed in a drilling operation wherein the drilling mud becomes exposed to a relatively high temperature, such as a temperature above about 250° F. during the drilling operation, the drilling mud deteriorates as evidenced by a material increase in the viscosity of the drilling mud, coupled with the formation of an undesirable viscous gel.

It is an object of this invention to provide a gyp mud having improved high temperature properties.

It is another object of this invention to provide a drilling reagent additive material suitable for the preparation and/or maintenance of a gyp drilling fluid characterized by a pH in the range of about 8 to 10.7, a relatively high dissolved calcium content and improved high temperature gelation properties.

It is another object of this invention to provide an improved drilling method.

How these and other objects are accomplished will become apparent in the light of the accompanying disclosure. In at least one embodiment of the practice of this invention, at least one of the foregoing objects will be achieved.

In accordance with the present invention, a dispersed gyp mud, that is, an aqueous drilling mud or drilling fluid containing clay and a clay dispersing agent, and characterized by an aqueous phase which has a pH in the range of from about 8 to 10.7 and a dissolved calcium content or calcium ion concentration in the aqueous phase thereof of at least 200 p.p.m. by weight, is improved as to high temperature properties by incorporating therein a minor amount, such as, for example, from about 0.1 to about 10 pounds per barrel, of a water soluble inorganic salt selected from the group consisting of a water soluble stannate, arsenite, periodate, chlorate, and vanadate salt including mixtures thereof. This range, 0.1 to 10 pounds per barrel, is equivalent to about 0.024 to about 2.4% by weight, based on a 10 pounds per gallon drilling fluid. The water soluble salt must be compatible with the drilling fluid.

The practice of this invention is particularly effective for improving the high temperature properties of gyp muds having a relatively high solids content, i.e., a suspended and/or dispersed solids content, such as clay solids, above about 10% by weight, particularly above about 15% by weight, based on the drilling fluid.

Suitable water soluble inorganic salts that can be satisfactorily employed in accordance with the practice of this invention to improve the high temperature properties of gyp mud drilling fluids include sodium stannate, sodium arsenite, sodium periodate, sodium vanadate, and the corresponding water soluble potassium, lithium, ammonium, calcium, barium and strontium derivatives of these anions.

It is surprising that the above-mentioned water soluble inorganic stannate, arsenite, periodate, chlorate, and vanadate salts, hereinafter referred to as the stannate-vanadate group, are capable of materially improving the high temperature properties of gyp drilling fluids when other water soluble inorganic salts are not effective in accomplishing this desirable result. For example, water soluble inorganic sodium and lithium compounds, such as sodium tungstate, sodium arsenate, sodium sulfite, sodium bisulfite, sodium metaborate, sodium carbonate, sodium permanganate and lithium zirconate, hereinafter called the tungstate-zirconate group, are not effective in improving the high temperature properties of gyp mud drilling fluids. Gyp drilling fluids containing these salts do not show any material improvement in high temperature properties, and in some cases these salts exhibit adverse effects on the fluid properties of the resulting drilling fluids.

The unsatisfactory results obtained, using this latter above-mentioned group of inorganic salts, namely, the tungstate-zirconate group, illustrate further the unexpected specificity of the salts of the present invention in improving the high temperature properties of gyp drilling fluids.

Accordingly, a drilling mud in accordance with this invention contains water, a dispersed hydratable drilling clay material therein, a dispersing agent for said hydratable clayey material, a water soluble calcium salt, such as calcium sulfate, having a solubility in water sufficient to impart the desired calcium ion concentration in the aqueous phase thereof, a minor amount, such as 0.1 to 10 pounds per barrel of a water soluble alkali metal, ammonium or alkaline earth metal salt of the stannate, periodate, arsenite, chlorate, and vanadate anions or mixtures thereof, and, if desired, a suitable alkalinity agent, such as caustic soda in an amount sufficient to adjust the pH of the aqueous phase of the resulting drilling mud to a value in the range of about 8 to 10.7, but with the aqueous phase being unsaturated with calcium hydroxide.

A drilling fluid in accordance with this invention may be prepared in the first instance by the addition to water of a suitable drilling fluid reagent admixture prepared in accordance with the teachings of this invention, together with, if desired, a minor amount of an alkalinity agent such as sodium hydroxide, or by the addition of the special drilling mud additive of this invention to water containing hydratable drilling clay material dispersed therein, together with the addition of the usual drilling mud additives (water loss additive, weighting material, oil emulsifying agent, and the like). Further, if desired, a conventional aqueous drilling fluid may be converted by the addition thereto of an alkalinity agent such as caustic soda, a water soluble calcium salt, such as calcium sulfate and a clay dispersing agent, together with a water soluble inorganic salt selected from the abovementioned stannate-vanadate group of salts, in accordance with the present invention to yield an improved gyp mud drilling fluid.

In the preparation of an improved drilling fluid in accordance with this invention, a drilling mud additive material is conveniently employed. In accordance with one embodiment a drilling mud additive material suitable for use in the practice of this invention includes an admixture of a water soluble calcium salt, such as calcium sulfate, a dispersing agent for clayey material, such as a ferrochrome-containing lignosulfonate, and a water soluble inorganic salt selected from the above-mentioned stannate-vanadate salts, in the weight range ratio of 0.1–10; 0.1–10; 0.01–2, respectively. This admixture, when employed in the preparation of an improved gyp mud in accordance with this invention, is incorporated in the drilling fluid in an amount in the range 5 to 20 pounds per barrel of drilling fluid.

The following tests are indicative of the practice of this invention and demonstrate how the high temperature properties of a dispersed gyp drilling mud characterized by an aqueuous phase having a pH in the range of about 8 to 10.7, and a dissolved calcium content of at least 200 parts per million by weight, are improved by incorporating or otherwise adding or associating with the drilling fluid, a water soluble salt selected from the stannate-vanadate group of inorganic salts. In the tests a conventional dispersed gyp–Q-Broxin mud which had been employed in a drilling operation was used as the base mud.

The inorganic salts were incorporated in the mud in amounts of 1.5 pounds of salt per barrel of mud. The dispersed gyp mud tested possessed the following properties: weight—11.2 lbs. per gallon, about 20% by volume of solids, 8% by volume oil emulsified therein using minor amounts of a conventional oil emulsifier as the emulsifying agent. Samples of the above-described dispersed gyp mud were treated by incorporating therein compounds of the stannate-vanadate group of salts in accordance with this invention to improve the high temperature properties thereof. The resulting treated and untreated drilling muds were then subjected to various tests. The results of these tests are set forth in accompanying Table II.

Table II

| Sample No. | Treatment | Stormer Viscosity, ° cpe. V600 | Stormer Viscosity, ° cpe. V100 | Ca++, p.p.m. | pH | Properties after heating 24 hrs. at 320° F. Shear Value, lbs./100 ft.² |
|---|---|---|---|---|---|---|
| 1 | None | *42 | *111 | *526 | *8.8 | 775 |
|   |   | Fluid to Plastic† |   |   | †6.61 |   |
| 2 | Sodium stannate | *30 | *54 | *160 | *9.32 | 200 |
|   |   | †91 | †464 |   | †6.95 |   |
| 3 | Sodium arsenite | *32 | *71 | *400 | *9.66 | 320 |
|   |   | Fluid, HG† |   |   | †7.00 |   |
| 4 | Sodium periodate | *24 | *68 | *720 | *8.0 | 360 |
|   |   | Fluid, High Gels† |   |   | †6.36 |   |
| 5 | Sodium chlorate | *36 | *68 | *540 | *9.25 | 465 |
|   |   | Fluid, High Gels† |   |   | †6.48 |   |
| 6 | Sodium vanadate | *29 | *55 | *320 | *10.28 | 525 |
|   |   | Fluid, High Gels† |   |   | †6.83 |   |

*Before bombing for 24 hours at 320° F.
†After bombing for 24 hours at 320° F.

The data in Table II above show that the addition of minor amounts of the water soluble salts of this invention, namely, the stannate-vanadate group, to a gyp mud drilling fluid, results in a marked improvement in the high temperature properties of the drilling fluid. In particular, the data show that the viscosities and shear values of the base gyp mud (Sample No. 1) were significantly lowered in each of the tests.

These data effectively illustrate the effectiveness of the water soluble inorganic stannate, arsenite, periodate, chlorate and vanadate salts in imparting superior high temperature properties to dispersed gyp mud drilling fluids.

Another series of tests were conducted using other inorganic salts to demonstrate the selectivity of the water soluble inorganic salts of this invention, the stannate-vanadate group, in improving the high temperature properties of gyp mud drilling fluids. In these series of tests the base mud used in Table II was also employed as the base mud. These other inorganic salts, the tungstate-zirconate group, were used in amounts of 1.5 pounds of the inorganic salt per barrel of mud. The resulting treated muds were then tested and the results obtained are shown in Table III.

For reference, the data of Table II for Sample No. 1, the untreated base gyp mud is reproduced in this Table III.

Table III

| Sample No. | Treatment | Stormer Viscosity, ° cpe. V600 | Stormer Viscosity, ° cpe. V100 | Ca++, p.p.m. | pH | Properties after heating 24 hrs. at 320°F. Shear Value, lbs./100 ft.² |
|---|---|---|---|---|---|---|
| 1 | None | *42 | *111 | *526 | *8.8 | 775 |
|   |   | Fluid to Plastic† |   |   |   |   |
| A | Sodium tungstate | *25 | *42 | *300 | *9.17 | 615 |
|   |   | Plastic † |   |   | †6.45 |   |
| B | Sodium arsenate | *35 | *83 | *380 | *9.30 | 635 |
|   |   | Fluid to Plastic † |   |   | †6.78 |   |
| C | Sodium bisulfite | *49 | *152 | *440 | *7.30 | 615 |
|   |   | Fluid to Plastic † |   |   | †6.37 |   |
| D | Sodium permanganate | *28 | *45 | *280 | *9.7 | 565 |
|   |   | Fluid to Plastic † |   |   | †7.38 |   |
| E | Lithium zirconate | *31 | *57 | *280 | *11.25 | 740 |
|   |   | Fluid to Plastic † |   |   | †6.87 |   |
| F | Sodium sulfite | *25 | *42 | *220 | *9.38 | 1,350 |
|   |   | Plastic † |   |   | †6.36 |   |
| G | Sodium carbonate | *31 | *57 | *120 | *9.47 | 740 |
|   |   | Plastic † |   |   | †6.50 |   |
| H | Sodium metaborate | *35 | *60 | *380 | *9.49 | 1,115 |
|   |   | Plastic † |   |   | †6.40 |   |

*Before bombing for 14 hrs. at 320° F.
†After bombing for 24 hrs. at 320° F.

The test results set forth in Table III, above, show that the addition of the tungstate-zirconate group of inorganic salts to the base gyp mud had adverse effects on the "after bombing" flow properties of the base mud. This is particularly evident in the case of tungstate, sulfite, carbonate and metaborate salts where the "after heating" fluid properties of the base gyp mud were changed to "plastic." In the samples wherein the inorganic salts, arsenate, bisulfite, permanganate, and zirconate were used, the shear values obtained were not significantly different from the shear value of the base mud.

The beneficial results obtained with the water soluble inorganic salts, in accordance with this invention, namely, the stannate-vanadate group of inorganic salts, and the adverse results obtained with the tungstate-zirconate group of salts, as recorded in Tables II and III above, respectively, demonstrate the unexpected advantages of the stannate-vanadate group of salts in gyp mud drilling fluids to control the high temperature properties thereof. It is apparent from these data that such unobvious results are attributable to the specificity of the stannate-vanadate group of inorganic salts in the gyp mud system.

The high degree of specificity of the salts of the present invention in the gyp mud system is demonstrated by the fact that of the foregoing salts only one, namely, the stannate salt, is effective in improving the high temperature properties of the so-called "shale control mud" system.

The gyp muds differ from the shale control muds in the feature that gyp muds are unsaturated with calcium hydroxide and exhibit a pH between about 8 and 10.7, whereas the shale control mud is saturated with calcium hydroxide and has a pH between 11 and 12.6.

Our copending patent application Serial No. 204,074, filed concurrently herewith, relates to the use of compatible water soluble stannates, arsenates, sulfites, bisulfites and metaborates including mixtures thereof to improve the high temperature properties of the shale control muds.

This application is a continuation-in-part of our copending application Serial No. 785,801, filed January 9, 1959, now abandoned.

We claim:

1. An aqueous drilling fluid comprising an aqueous phase which is unsaturated with calcium hydroxide, said aqueous phase having a water soluble calcium salt dissolved therein to yield a calcium ion concentration of at least 200 parts per million by weight and a minor amount in the range of from about 0.1 to about 10 lbs. per barrel of said drilling fluid of a compatible water soluble inorganic salt selected from the group consisting of alkali metal, ammonium and alkaline earth metal salts of the stannates, arsenites, periodates, chlorates, vanadates and mixtures thereof.

2. An aqueous drilling fluid comprising hydratable clayey material dispersed in an aqueous phase, said aqueous phase having dispersed therein an amount of solids above 10% by volume based on said drilling fluid, having a pH in the range between about 8 to 10.7, containing calcium sulfate dissolved therein to yield a calcium ion concentration of at least 200 parts per million by weight, a lignosulfonate dispersing agent for said clayey material and a minor amount in the range of about 0.1 to 10 pounds per barrel of said drilling fluid of a compatible water soluble inorganic salt selected from the group consisting of alkali metal, ammonium and alkaline earth metal salts of the stannates, arsenites, periodates, chlorates, vanadates and mixtures thereof.

3. A drilling fluid in accordance with claim 2 wherein said water soluble salt is sodium stannate.

4. A drilling fluid in accordance with claim 2 wherein said water soluble salt is sodium arsenite.

5. A drilling fluid in accordance with claim 2 wherein said water soluble salt is sodium periodate.

6. A drilling fluid in accordance with claim 2 wherein said water soluble salt is sodium chlorate.

7. A drilling fluid in accordance with claim 2 wherein said water soluble salt is sodium vanadate.

8. A drilling fluid in accordance with claim 2 wherein said water soluble salt is a mixture of sodium stannate and sodium arsenite.

9. A drilling fluid in accordance with claim 2 wherein said lignosulfonate dispersing agent is a ferrochrome-containing lignosulfonate.

10. A drilling fluid in accordance with claim 2 wherein the pH of said aqueous phase is in the range of about 8.5 to 10.5.

11. A drilling fluid in accordance with claim 2 wherein said pH is in the range 8.5 to 10.5, said calcium ion concentration is in the range of about 500 to 2000 p.p.m., and wherein said water soluble compound is sodium stannate.

12. In the drilling of a borehole through a subterranean formation wherein a drilling fluid is passed through the borehole in contact with said formation during the drilling operation, the improvement which comprises contacting said formation with an aqueous drilling fluid comprising an aqueous phase which is unsaturated with calcium hydroxide, contains a water soluble calcium salt dissolved therein to yield a calcium ion concentration of at least 200 parts per million by weight, and a minor amount in the range of from about 0.1 to about 10 lbs. per barrel of said drilling fluid of a compatible water soluble salt selected from the group consisting of the alkali metal, ammonium and alkaline earth metal salts of the inorganic stannates, arsenites, periodates, chlorates, vanadates and mixtures thereof.

13. In the drilling of a borehole through a subterranean formation wherein an aqueous drilling mud is passed through the borehole in contact with said formation during the drilling operation, the improvement which comprises contacting said formation with an aqueous drilling mud comprising a hydratable clayey material dispersed in an aqueous phase in an amount above 10 percent by volume based on said drilling mud with a lignosulfonate dispersing agent, having a pH in the range 8 to 10.7 and having a calcium ion concentration in excess of 200 p.p.m., said aqueous phase being unsaturated with respect to calcium hydroxide, and a minor amount in the range 0.1 to 10 pounds per barrel based on said drilling mud of a compatible water soluble salt selected from the group consisting of a water soluble alkali metal, ammonium and alkaline earth metal salts of the stannates, arsenites, periodates, chlorates, vanadates and mixtures thereof.

14. A method in accordance with claim 13 wherein said dispersing agent is a ferrochrome-containing lignosulfonate.

15. A method in accordance with claim 13 wherein said dispersing agent is a ferrochrome-containing lignosulfonate and wherein said calcium ion concentration in said aqueous phase is obtained by dissolving calcium sulfate therein.

16. A method in accordance with claim 13 wherein said dispersing agent is a ferrochrome-containing lignosulfonate, wherein said calcium ion concentration in said aqueous phase is obtained by dissolving calcium sulfate therein and wherein said water soluble salt is sodium stannate.

17. A method in accordance with claim 13 wherein said water soluble salt is sodium arsenite.

18. A method in accordance with claim 13 wherein said water soluble salt is sodium periodate.

19. A drilling mud additive suitable for the preparation of an aqueous drilling fluid having a pH in the range 8 to 10.7 and a calcium ion concentration in excess of 200 parts per million by weight consisting essentially of a water soluble calcium salt, a dispersing agent for clayey material, and a compatible water soluble inorganic salt selected from the group consisting of alkali metal, ammonium, and alkaline earth metal salts of water soluble stannates, arsenites, periodates, chlorates, vanadates and mixtures thereof in the weight ratio range of $$0.1-1:0.1-10:0.01-2$$

respectively.

20. An additive in accordance with claim 19 wherein said water soluble calcium salt is calcium sulfate, wherein said dispersing agent is a ferrochrome-containing lignosulfonate, and wherein said water soluble salt is sodium stannate.

References Cited in the file of this patent
UNITED STATES PATENTS

| | | |
|---|---|---|
| 1,728,662 | Chwala | Sept. 17, 1929 |
| 2,160,949 | Williams | June 6, 1932 |
| 2,377,309 | Butler et al. | June 5, 1945 |
| 2,450,936 | Cardwell | Oct. 12, 1948 |
| 2,452,021 | Wayne | Oct. 19, 1948 |
| 2,602,777 | Wayne | July 8, 1952 |
| 2,802,783 | Weiss et al. | Aug. 13, 1957 |
| 2,868,726 | Brukner et al. | Jan. 13, 1959 |
| 2,935,504 | King et al. | May 3, 1960 |

OTHER REFERENCES

Hurdle: Gyp Muds Now Practical for Louisiana Coastal Drilling, articles in the Oil and Gas Journal, October 28, 1957, pp. 93–95.

UNITED STATES PATENT OFFICE
CERTIFICATE OF CORRECTION

Patent No. 3,177,141                                    April 6, 1965

John S. Brukner et al.

It is hereby certified that error appears in the above numbered patent requiring correction and that the said Letters Patent should read as corrected below.

Column 4, line 53, for "aqueuous" read -- aqueous --; column 5, Table III, footnotes thereof, line 1 thereof, for "14 hrs." read -- 24 hrs. --.

Signed and sealed this 7th day of December 1965.

(SEAL)
Attest:

ERNEST W. SWIDER                                EDWARD J. BRENNER
Attesting Officer                                    Commissioner of Patents